Jan. 11, 1966
C. MATYEAR
3,228,858
HYDROGENATION UNIT TRIM CONTROL SYSTEM
Filed June 6, 1962
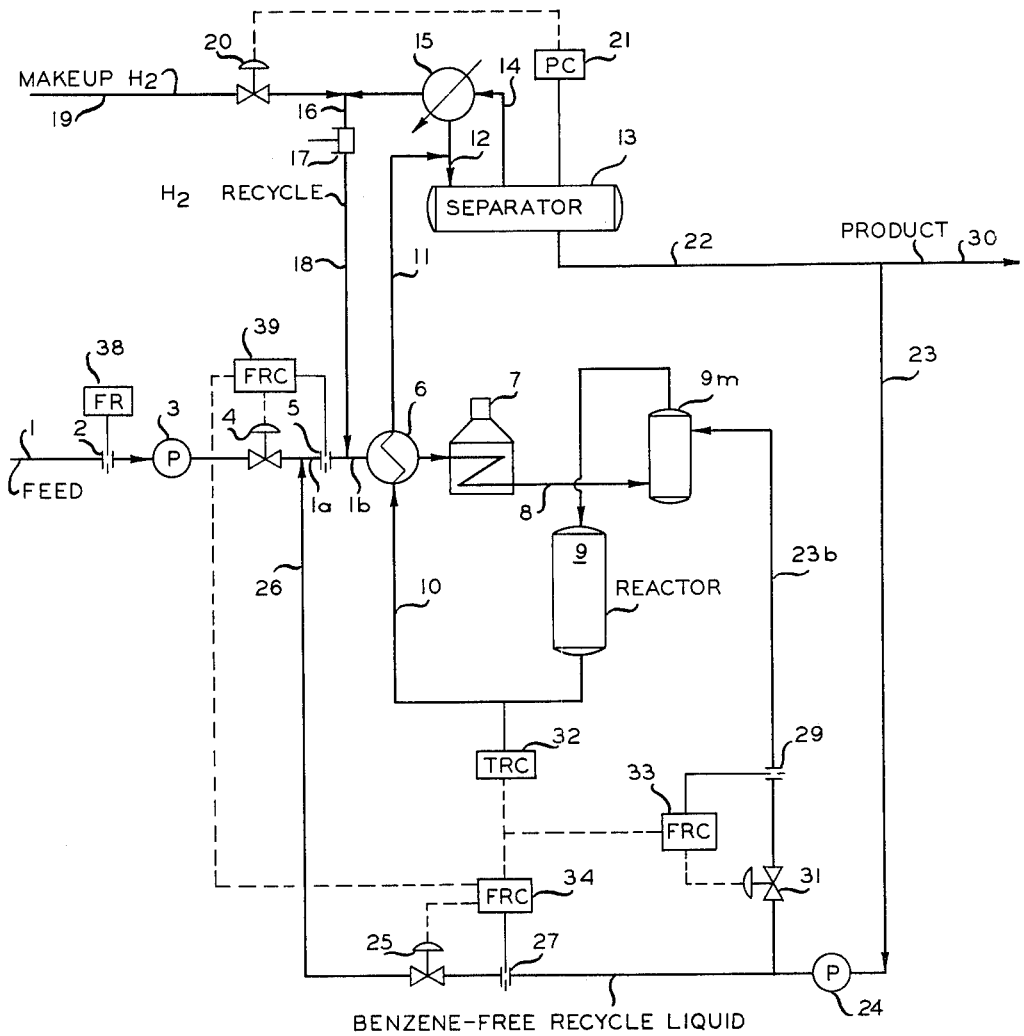
INVENTOR.
CHARLES MATYEAR
BY Young & Quigg
ATTORNEYS

United States Patent Office 3,228,858
Patented Jan. 11, 1966

3,228,858
HYDROGENATION UNIT TRIM CONTROL SYSTEM
Charles Matyear, Sweeny, Tex., assignor to Phillips Petroleum Company, a corporation of Delaware
Filed June 6, 1962, Ser. No. 200,452
3 Claims. (Cl. 196—155)

This invention relates to hydrogenation of unsaturated organic oils. In one of its aspects, this invention relates to a hydrogenation control system having fast response.

It is well known in the art to hydrogenate unsaturated organic oils such as vegetable oils and fats, hydrocarbons such as aromatics and olefins, and the like. The hydrogenation of such compounds is frequently carried out in a liquid or fluid diluent and in the presence of a catalyst. Such hydrogenations are exothermic and sometimes, due to system upsets, the temperature in the hydrogenation units gets out of control necessitating shut down. It is desirable that the hydrogenation unit operate above a predetermined minimum temperature in order that the reaction will proceed. On the other hand, it is desirable to operate below a predetermined maximum temperature to prevent unwanted side reactions. For example, in the conventional hydrogenation of benzene to cyclohexane, in the presence of saturated hexanes diluent and a nickel-supported catalyst, it is necessary to maintain the feed above about 380° F. to maintain the hydrocarbon in vapor phase, since liquid is detrimental to the conventional catalyst, and to maintain a reactor outlet temperature of not more than about 500° F. to prevent a demethylation-hydrogenation reaction from taking place which would result in run-away temperatures.

The art is aware of the hydrogenation of unsaturated compounds in the presence of a catalyst and no extensive discussion of these is needed here, this not being my invention. Such hydrogenations are frequently carried out in the presence of a fluid diluent and the diluent recycled in order to maintain the unsaturated compound at the desired concentration to maintain the reactor temperature within the optimum operating limits. As has been indicated, the hydrogenation reaction is exothermic and each mol of material being hydrogenated will have an effect on reactor temperature.

When benzene is hydrogenated to cyclohexane in the presence of a nickel on kieselguhr catalyst and in the presence of diluent, each percent benzene in the feed causes a temperature rise of about 20° F. across the reactor. As has been indicated, the feed should be above about 380° F., preferably at about 400° F. for good hydrogenation and it is necessary to maintain the outlet temperature no higher than about 500° F. Therefore, the percent benzene in the feed to the reactor can be controlled by regulating the amount of recycle, regulating the rate of fresh feed, or both.

Thus, the prior art discloses means for continuously detecting the temperature of the reactor effluent, means for regulating the flow of recycle liquid (which is converted to vapor prior to entering the reaction zone) to the reactor responsive to changes in the detected temperature through a predetermined temperature range, and means for regulating the flow of fresh feed to the reactor responsive to changes in the detected temperature above said predetermined range.

In actual practice, it has been found that there is a significant time delay for the diluent-diluted fresh feed to reach the reactor and reverse the rising temperature trend. This unavoidable delay may permit the temperature of the reactor effluent to reach 500° F. before the damping effect of the benzene-free diluent recycle is experienced in the reactor. For optimum product quality, some means of achieving faster response of the control system to temperature upsets is most desirable.

It is an object of this invention to provide an improved control system for a hydrogenation process.

It is another object of this invention to provide a system for quicker control of reactor outlet temperature in an exothermic hydrogenation process.

Still other objects, features and advantages of this invention will be obvious to those skilled in the art having been given this disclosure.

According to this invention, temperature variations of the reactor effluent outside acceptable limits are modified by diverting a minor portion (normally zero) of the recycling benzene-free diluent responsive to high reactor effluent temperature to a quench zone disposed in the reactor feed conduit and intermediate said total feed heater and the hydrogenation reaction zone; the resulting admixing with the feed partially but quickly reducing the benzene present in the feed, and rapidly reducing the temperature of the reactor effluent due to the sensible heat and latent heat of vaporization of the quench fluid. According to one aspect of the invention, means are provided for continuously detecting the temperature of the reactor effluent, means for regulating the flow of recycle diluent via a bypass conduit to the quench zone responsive to changes in the detected effluent temperature through a second predetermined temperature range, means for regulating the flow of recycle diluent to the fresh feed conduit responsive to changes in the detected effluent temperature through a first predetermined temperature range, and means for regulating the flow of fresh feed to the reactor responsive to changes in the detected temperature through a third predetermined temperature range.

As has been indicated, this invention is applicable broadly to hydrogenation of unsaturated organic compounds such as vegetable oils, fatty oils and hydrocarbons. The invention is particularly applicable to hydrogenation of hydrocarbons boiling in the gasoline boiling range. In general, such hydrocarbons will be olefins of 4 to 30 carbon atoms per molecule and mononuclear aromatics containing up to 36 carbon atoms with up to 6 carbon atoms in any nuclear substituent. This latter class of compounds can be represented by the formula:

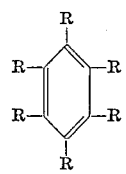

wherein R is hydrogen, alkyl, or alkenyl and wherein total carbon atoms in any one R does not exceed 6 and wherein the total carbon atoms in such substituents does not exceed 30.

While such unsaturated hydrocarbons are those usually employed, it will be recognized by those skilled in the art that the method and apparatus of this invention will be applicable to the hydrogenation of unsaturated hydrocarbons in general. Examples of such hydrocarbons include olefins, such as butene, isobutylene, butadiene, pentene-1, pentene-2, 2-methylpentene-1, 2,5-octadiene, 4-ethyloctene-1, nonene-3, 1,4,9-octadecatriene, tricontene-1, and the like; and aromatics such as benzene, paraxylene, metaxylene, orthoxylene, toluene, 1,3,5-trimethylbenzene, 1,2,3,4,5,6-hexylpentyl benzene, 2-hexyl benzene, 1-methyl-2-ethylbenzene, styrene, and the like. Other materials which can be hydrogenated using the control system of this invention include polynuclear aromatics, such as biphenyls, naphthalenes, and the like, heterocyclic compounds such as pyridines and quinolines, unsaturated acids such as maleic, fumaric, itaconic, methylethylmaleic, glutaconic, alpha-methylglutaconic, alpha,beta,gamma-tributylglutaconic, 2-pentadeconic acids, and the like.

Any catalyst suitable for hydrogenation is applicable in this invention. Examples of such catalysts include nickel, platinum, tungsten, and molybdenum. These materials are generally finely divided and are on a porous support such as precipitated alumina, alumina-silica coprecipitate or kieselguhr.

This invention will be further described with reference to the attached drawing which is a schematic flow diagram of a typical hydrogenation process utilizing the control of this invention.

Referring now to the drawing, the unsaturated organic compound, feed, passes via conduit 1, orifice 2, pump 3, valve 4, conduit 1a, orifice 5, conduit 1b, and heat exchanger 6 to heater 7. Flow recorder 38 is operably connected to orifice 2 and registers the flow of fresh feed to the system. Flow recorder controller 39, with a preset manual loading station, is operably connected to orifice 5 and valve 4 so as to regulate the flow of material at a rate determined as hereinafter explained. The reactor feed is heated in exchanger 6 by heat exchange with the reactor effluent and is varied to the desired reactor feed temperature in heater 7. It is within the skill of the art to use automatic controls in heater 7 if desired. Such control can regulate the heat source, e.g., fuel, to the heater responsive to temperature changes in the heater effluent in conduit 8. The heater effluent passes via conduit 8 to reactor 9 which is packed with a suitable catalyst and wherein the reaction takes place. Disposed in conduit 8, just ahead of reactor 9 is a mixing zone 9m, the purpose of which will be described later. It is within the scope of this invention and within the skill of the art to use a moving bed catalyst if desired.

The effluent from reactor 9 passes via conduit 10 to heat exchanger 6 where it gives up some heat to the feed stream. The somewhat cooled effluent then passes via conduits 11 and 12 to separator 13 where gaseous hydrogen and liquid hydrocarbon are separated. The hydrogen, along with some low boiling hydrocarbon, passes overhead via conduit 14 to condenser 15 where the hydrocarbons are condensed and passed back to separator 13 via conduit 12. The hydrogen passes via conduit 16, compressor 17 and conduit 18 to conduit 1b where it is admixed with the fresh feed and passed via heat exchanger 6, heater 7 and conduit 8 to the reactor 9. Since hydrogen is consumed in reactor 9, makeup hydrogen must be added. This makeup hydrogen is added to the recycle hydrogen in conduit 16 via conduit 19 and valve 20. This valve 20 can be operated responsive to changes in the system pressure such as by means of pressure-controller 21 operably connected to separator 13 to continuously detect the pressure therein and to valve 20 to regulate the flow of gas therethrough responsive to changes in separator 13 pressure.

The liquid product from separator 13 is removed via conduit 22 and a portion is passed as recycle via conduit 23, pump 24, orifice 27, valve 25, and conduit 26, to conduit 1a where it is admixed with the fresh feed. The rate of recycle of product is controlled responsive to changes in temperature of the reactor 9 effluent. A bypass quench conduit 23b, having orifice 29 and motor valve 31 disposed therein, communicates between recycle conduit 23 and flash zone 9m, said conduit being sized to permit a portion, e.g. 10% by volume, of the total flow in conduit 23 to pass to zone 9m. Thus, some benzene-free recycle diluent liquid contacts vaporized total feed, partially diluting the benzene concentration thereof, and cooling the mass by evaporation before the hydrogenation step in reactor 9.

A temperature recorder-controller 32 is operably connected with effluent condit 10 to continuously determine the temperature of the flowing stream therein. This temperature recorder-controller 32 effects control of both conventional flow recorder-controller 33 and conventional split range flow controller 34. Flow controller 33 can be omitted in some operations, and the signal from TRC 32 can be used to control valve 31 in the quench line 23b.

When the reactor effluent 10 temperature increases beyond a first predetermined value, TRC 32 causes valve 25 to be further opened to allow an increase of benzene-free recycle to be added by way of conduit 26 to the benzene-containing feed in conduit 1. This flow is above the original amount demanded by the original set point of FRC 34, to thereby decrease the volume percentage of benzene in the total feed to the reactor.

If the effluent 10 temperature continues to rise above a second predetermined temperature level, valve 25 continues to further open in proportion to the difference between the actual effluent temperature in conduit 10 and the first predetermined temperature, and valve 31 in the liquid bypass conduit 23b starts to open. Valve 31 opens in proportion to the difference between the actual effluent temperature in conduit 10 and the second predetermined temperature.

As the temperature continues to rise above the second predetermined temperature, valve 31 will open to its maximum opening, permitting additional diluent, but constituting only a minor portion of the total available diluent recycle, to pass to zone 9m. After bypass valve 31 is opened to its maximum, but the effluent 10 temperature continues to be above the second predetermined level, valve 25 will continue to open to its maximum, if necessary.

If the reactor effluent 10 temperature falls to below the second predetermined temperature, valve 31 in the quench conduit 23b will, of course, close, and the total diluent now passes only through valve 25 in the larger conduit 26.

If the temperature of reactor effluent 10 still is above the second predetermined temperature, valve 31 will, of course, remain at least partially opened. If the maximum signal is passed on the low range of FRC 34, valve 25 will be at its maximum opening, and the high range signals of FRC 34 will take over to actuate control of valve 4 in the benzene-containing feed line, by way of FRC 39, to decrease the quantity of benzene-free fresh feed charged by way of line 1.

Since liquid recycle conduit 26 is physically limited as to size, adequate temperature control cannot always be achieved by merely increasing the recycle diluent alone. A separate control of fresh feed rate may be necessary.

If the reactor effluent 10 temperature continues to rise, or steadies above prescribed limits, even while valve 25 is fully open (and valve 31 is fully opened or closed, depending on the actual temperature, whether above or below the second predetermined temperature) the second range at FRC 34 takes over and acts to reset FRC 39 on the fresh feed, or benzene-containing feed, so as to reduce the flow of fresh feed through valve 4. Reducing the total feed to the reactor to a lower value, below the amount demanded by the original set point of flow controller 39, decreases the volume percentage of benzene in the total feed to a level whereby the desired reactor effluent 10 first predetermined temperature is maintained. When this desired first predetermined temperature is thusly attained, the valve 31 is, of course, closed (since the attained desired temperature is below the aforementioned second predetermined temperature value), and valve 25 will be fully opened as demanded by the new set point on FRC-34.

When the amount of benzene in the fresh feed starts to decrease, the temperature sensed by temperature recorder controller 32 starts to decrease to below the first predetermined temperature. TRC 32 actuates the flow rate controller 34 to pinch down on motor valve 25 so as to reduce the flow of recycle diluent therethrough, returning FRC 34 toward its original set point to maintain the desired volume percent benzene in the total feed to the reactor. Ultimately, FRC 34 reaches this set point, and remains thereat while the concentration of benzene in the total feed remains at an acceptable level.

With a further decrease in volume percent benzene in the fresh feed, the temperature sensed by temperature recorder controller 32 again starts to decrease to below the first predetermined temperature, then TRC 32, by way of flow controller 34, now actuates flow controller 39, with its preset manual loading station to throttle open valve 4, increasing the flow of fresh feed therethrough, returning controller 39 towards its original set point. Ultimately, controller 39 reaches this set point, and remains at this original set point when the amount of benzene is at a sufficiently high level, to maintain the reactor effluent temperature at the first predetermined level. Product not drawn off by conduit 23 is passed via conduit 30 to product storage, or further treatment, as desired.

In the above description, valves, pumps and the like, except as needed to describe the system, have been omitted and can be supplied by those skilled in the art. Various modifications can be made as desired. For example, a condenser could be used in conduit 11, the hydrogen makeup, if under pressure, can be added to the recycle line downstream of compressor 17. Other modification will be obvious to those skilled in the art.

I will further describe this invention by describing an embodiment wherein benzene is being hydrogenated to cyclohexane.

The benzene-containing fresh feed in conduit 1 has originally the following composition:

| | Volume percent |
|---|---|
| Benzene | 6.8 |
| Cyclohexane | 0.3 |
| Methylcyclopentane | 29.0 |
| Normal hexane | 43.0 |
| 3-Methylpentane | 15.0 |
| 2-Methylpentane | 5.7 |
| 2,3-Dimethylbutane | 0.2 |
| | 100.0 |

In hydrogenation of a benzene-containing stream, in this exothermic reaction, the temperature rise across the reactor 9 is about 20° F. per each percent of benzene in the total feed. The total feed to the reactor must be above 380° F., preferably about 400° F. to minimize liquid in the feed to the reactor which liquid feed is detrimental to the catalyst as is known in this field of operation. Also, the reactor outlet temperature, conduit 10, must not be above about 500° F., due to the demethylation, preferably not above 480° F. in order to produce maximum quantity and quality of product.

Since the feed to the reactor in this 120° F. maximum difference between the inlet and outlet of the reactor must contain less than about 6 volume percent benzene, and practically about 4 volume percent benzene, it is necessary to dilute fresh feed stocks containing more than about 6 volume percent benzene with a hydrocarbon diluent free of benzene; e.g., a portion of the reactor effluent. Also, it is necessary to have a mol ratio of hydrogen to benzene of about 4:1 up to 12:1, preferably about 9:1 minimum.

In a specific operation using a conventional nickel-kieselguhr supported catalyst, the feed to reactor 9 containing 6.8 volume percent benzene is heated to 402° F. in heater 7 and the reaction is at a pressure between 400–500 p.s.i.a., e.g., 450 p.s.i.g. in the example. The mol ratio of hydrogen to benzene is 9:1. The reactor effluent exits via conduit 10 at 480° F. and the fresh feed plus benzene-free diluent has a benzene content of 4.0 volume percent charged at the rate of fresh feed of 58.8 barrels per hour via conduit 1, and 41.2 barrels per hour of diluent via conduit 26, giving a total of 100 barrels per hour feed to reactor 9. At this condition, no benzene-free diluent is passing via conduit 23b to quench vessel 9m.

The temperature recorder-controller 32 on the reactor effluent operates on flow controller 33 and valve 31 and on the conventional split range flow recorder-controller 34, as explained above. The air signal produced by TRC 32 transmits a signal ranging from 0 to 15 p.s.i.g., the pressure being proportional to the temperature difference between the actual effluent temperature and the first predetermined temperature. In the lower range of 0–7 p.s.i.g. air pressure, the lower range of FRC 34 actuates control of valve 25 from partially open at 0 p.s.i.g. to fully open at 7 p.s.i.g. And between 7–15 p.s.i.g. air pressure, FRC 39 is actuated to be reset to control the position of valve 4 on the fresh feed in line 1. The signal from TRC 32 also actuates control of valve 31 in the bypass line via FRC 33.

While operating at the above conditions, there is a change in the benzene content of the fresh feed. The benzene increases to 10.2 volume percentage from the original 6.8 volume percentage. Since the system was operating at 48.8/41.2 ratio of fresh feed to recycle, the effective benzene volume percentage in the total feed would be 6 volume percentage, and the effluent temperature starts to rise above the first predetermined temperature of 480° F. (optimum) and would approach 522° F. As the temperature starts to rise, the air pressure signal from TRC 32 increases above zero (toward 7 p.s.i.g.) which effects a further opening up of valve 25 in the main recycle line. A signal of about 2–3 p.s.i.g. corresponds to an effluent temperature of 485° F., the aforementioned second predetermined temperature. As the temperature continues to rise above 485° F. TRC 32 resets FRC 33 to open quench valve 31, permitting some of the liquid recycle to flow directly to quench chamber 9m. Conduits 26 and 23b for economic purposes are limited in size and in pumping capacity. In this example of 100 barrels/hour total feed to heater 7, the maximum diluent flow is 50 barrels/hour, 5 barrels of which may pass through line 23b and 45 barrels of which may pass through line 26. As the diluent flow increases from 41.2 barrels/hour toward its 50 barrels/hour maximum and the reactor effluent temperature still tries to increase, the upper range of FRC 34 (valve 25 now being wide open) resets FRC 39 on conduit line 1, and effects a further cutting back of fresh feed to 32.3 barrels/hour, the effluent temperature 10 decreases to below the second predetermined temperature of 485° F., at which time valve 31 is shut, and all 50 barrels/hour recycle passes by way of valve 25. Ultimately, the effluent temperature reaches the desired first predetermined temperature of 480° F.

Table I below tabulates how the several process streams vary from original conditions, during the increase in benzene content, and the final operating conditions with benzene content steady at the higher level.

*Table I*

SPECIFIC EXAMPLE

|  | Original | During Quench | Final |
|---|---|---|---|
| Fresh Feed (1): |  |  |  |
| Benzene, Vol. Percent | 6.8 | 6.8 to 10.2 | 10.2 |
| Barrels/Hour | 58.8 | 58.8 to 32.3 | 32.3 |
| Benzene-Free Recycle (26): Barrels/Hour | 41.2 | 41.2 to 50.0 | 50.0 |
| Benzene-Free Quench (23b): Barrels/Hour | 0 | 0 to 5 to 0 | 0 |
| Benzene in Total Feed (lb.): Volume Percent | 4.0 | 4.0 to 6.0 to 4.0 | 4.0 |
| Reactor Temperatures: |  |  |  |
| Inlet ° F | 402 | Decreases | 402 |
| Outlet ° F | 480 | Rises | 480 |

When the volume percent of benzene in the fresh feed starts to decrease, e.g., back to 6.8%, the 7–15 p.s.i.g. range on FRC 34 actuates the return of the set point on FRC 39 from the above 82.3 barrels/hour, to the original 100 barrels/hour (with its preset 100 barrels/hour manual loading station). This operation, initially, effects opening of valve 4 to flow 50 barrels/hour to maintain the original preset 100 barrels/hour total feed. However, the benzene content of the total feed is only 3.4, which quantity attempts to effect too low a temperature signal on TRC 32. The 0–7 p.s.i.g. range takes over on FRC 32, and causes, by reset of FRC 34, valve 25 to pinch down to recycle only 41.2 barrels/hour, and FRC 39 effects an opening of valve 4 to flow 58.8 barrels/hour of fresh feed to result in 100 barrels/hour total feed, containing the desired 4.0 volume percent benzene. The hydrogen to benzene mol ratio is returned to 9:1.

This system uses optimum minimum recycle, while maintaining optimum reactor effluent temperature and the fresh charge at the maximum allowed by the FRC 39 preset as the maximum the equipment will handle whichever is smaller. Moreover, quicker damping of the rising temperature of the reactor effluent is achieved than possible in the control systems of the prior art.

Reasonable variations and modifications of this invention can be practiced in view of the foregoing disclosure. Such variations and modifications are clearly believed to come within the spirit and scope of the invention.

I claim:

1. An improved apparatus useful for hydrogenation comprising, in combination: a reactor; feed conduit means connected to one end of said reactor; an effluent conduit communicating between the other end of said reactor and a vapor-liquid separation means; a vapor outlet and a liquid outlet in said separation means; a liquid recycle conduit means communicating between said liquid outlet and said feed conduit; a quench zone disposed in said feed conduit between said recycle conduit means juncture and said reactor; a heater disposed in said feed conduit means between said recycle conduit means juncture and said quench zone; a recycle quench conduit communicating between said liquid recycle conduit and said quench zone; a temperature indicating means operatively connected to said reactor effluent conduit; first control valve means disposed in said recycle conduit; second control valve means disposed in said recycle quench conduit; a first flow controller operatively responsive to said temperature indicating means and operatively controlling said first control valve means; a second flow controller operatively responsive to the upper range of signals from said temperature indicating means, and operatively controlling said second control valve means; said first flow controller being adapted to automatically adjust said first valve by opening same, said second valve being closed, above a first predetermined optimum temperature whereby said first valve is more fully open; and said temperature indicating means being further adapted to automatically reset said second flow controller so as to adjust said second valve by opening same, while above a second and higher predetermined temperature, until said second valve is fully open.

2. An improved apparatus useful for hydrogenation comprising, in combination: a reactor; feed conduit means connected to one end of said reactor; a heater in said feed conduit; an effluent conduit means communicating between the other end of said reactor and a vapor-liquid separation means; a vapor outlet and a liquid outlet in said separation means; a liquid recycle conduit means communicating between said liquid outlet and said feed conduit upstream of said heater; a quench zone disposed in said feed conduit intermediate said heater and said reactor; a recycle quench conduit means communicating between said liquid recycle conduit and said quench zone; a temperature indicating means, operatively connected to said reactor effluent conduit; first control valve means disposed in said recycle conduit; second control valve means disposed in said recycle quench conduit; third control valve means disposed in said feed conduit upstream of the point of communication of said recycle conduit with said feed conduit; a split range first flow controller operatively responsive to said temperature indicating means and operatively controlling said first control valve means; a second flow controller operatively responsive to the upper-range of signals from said temperature indicating means, and operatively controlling said second control valve means; a third flow controller operatively responsive to the upper range of said first flow controller and operatively controlling said third flow control valve means; said first flow controller being adapted to automatically adjust said first valve by opening same, said second valve being closed, above a first predetermined optimum temperature, whereby said first valve is more fully open; said temperature indicating means being further adapted to automatically reset said second flow controller so as to adjust said second valve by opening same, while above a second and higher predetermined temperature, until said second valve is fully open; said third flow controller being further adapted to automatically adjust said third valve by throttling same, while said first and second valves are fully open, and while still above said first predetermined maximum temperature, whereby said third valve is at least partially closed.

3. An improved apparatus useful for hydrogenation comprising, in combination: a reactor; feed conduit means connected to one end of said reactor; a heater in said feed conduit; an effluent conduit means communicating between the other end of said reactor and a vapor-lined separation means; vapor recycle conduit means connected to said vapor outlet and to said feed conduit upstream of said heater; a vapor outlet and a liquid outlet in said separation means; a liquid recycle conduit means communicating between said liquid outlet and said feed conduit upstream of said heater; a quench zone disposed in said feed conduit intermediate said heater and said reactor; a recycle quench conduit means communicating between said liquid recycle conduit and said quench zone; a temperature indicating means; first control valve means disposed in said recycle conduit; second control valve means disposed in said recycle quench conduit; third control valve means disposed in said feed conduit upstream of the point of communication of said recycle conduit with said feed conduit; a split range first flow controller operatively responsive to said temperature indicating means and operatively controlling said first control valve means; a second flow controller operatively responsive to the upper-range of signals from said temperature indicating means, and operatively controlling said second control valve means; a third flow controller operatively responsive to the upper range of said first flow controller and operatively controlling said third flow control valve means; said first flow controller being adapted to automatically adjust said first valve by opening same, said second valve being closed, above a first predetermined maximum temperature whereby said first valve is more fully open; said temperature indicating means being further adapted to automatically reset said second flow controller so as to adjust said second valve by opening same, above a second and higher predetermined maximum temperature, until said second valve is fully open; said third flow controller being further adapted to automatically adjust said third valve by throttling same, while said first and second valves are fully open, and while still above said first predetermined maximum temperature, whereby said third valve is at least partially closed.

References Cited by the Examiner

UNITED STATES PATENTS

| | | | |
|---|---|---|---|
| 2,303,075 | 11/1942 | Frey | 260—683.9 |
| 2,303,118 | 11/1942 | Frey | 260—683.9 |
| 2,332,572 | 10/1943 | Hepp et al. | 260—683.9 |
| 2,934,573 | 4/1960 | Paulsen et al. | 260—667 |
| 2,977,288 | 3/1961 | Cabbage | 260—683.9 |
| 2,979,546 | 4/1961 | Grandio | 260—667 |
| 2,990,431 | 6/1961 | Cabbage | 260—667 |

DELBERT E. GANTZ, *Primary Examiner.*

ALPHONSO D. SULLIVAN, *Examiner.*